April 23, 1968     M. E. GEHRUNG     3,379,345
STORAGE VESSEL OR FEED UNIT FOR POWDERED MATERIALS
WITH AIR-PERMEABLE GUIDING OR SEPARATING WALLS
Filed Dec. 8, 1966
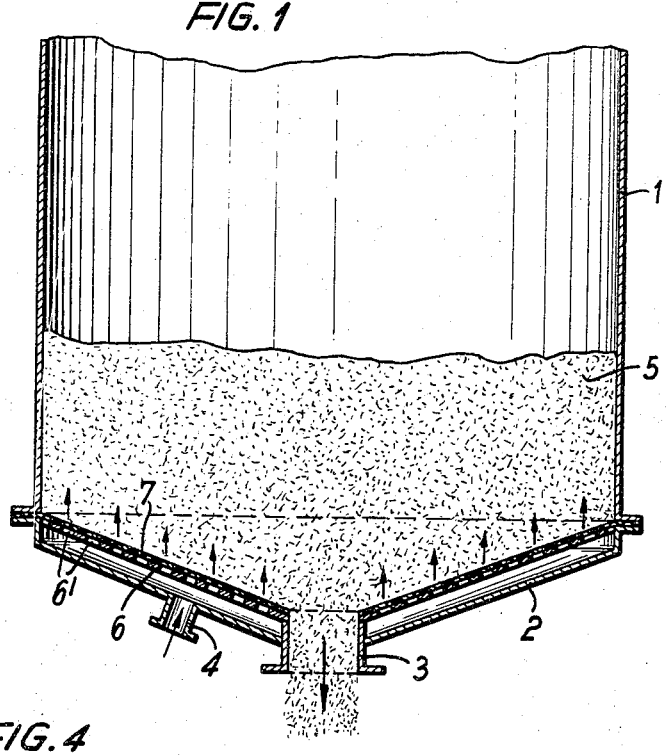
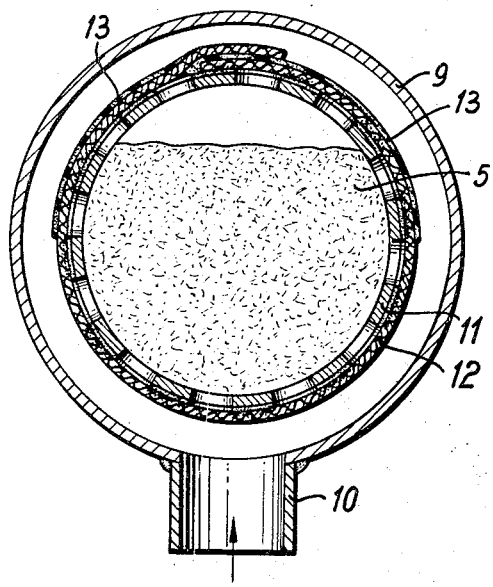
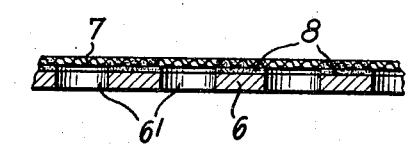

United States Patent Office 3,379,345
Patented Apr. 23, 1968

3,379,345
STORAGE VESSEL OR FEED UNIT FOR POW-
DERED MATERIALS WITH AIR-PERMEABLE
GUIDING OR SEPARATING WALLS
Manfred Erwin Gehrung, Baden-Wurttemberg, Germany,
assignor to Werner & Pfleiderer, Stuttgart-Feuerbach,
Germany, a corporation of Germany
Filed Dec. 8, 1966, Ser. No. 600,091
Claims priority, application Germany, Dec. 21, 1965,
W 36,284
3 Claims. (Cl. 222—195)

ABSTRACT OF THE DISCLOSURE

A feed element for powdered materials comprises an outer airtight shell, a perforated inner shell with an air-permeable covering secured to the outside of said perforated shell, the air-permeable covering comprising at least one layer of woven material which is secured to the perforated shell by adhesion extending over a proportion of the area of the air-permeable covering, the adhesion area being chosen according to the resistance to air flow required of the covering.

---

The present invention relates to a storage vessel or feed unit for powdered materials with air-permeable guiding or separating walls formed from perforated backing plates with a covering of air-permeable material.

To be able to make powdered material held in storage vessels capable of flowing, it is the known practice to make the floor of the storage vessel of porous material or in the form of a perforated backing plate with a covering of woven material. Air is passed through this porous floor into the storage vessel and the powdered material held in the storage vessel, for example flour or the like, is made capable of flowing so that it can be introduced into the metering channel or feed pipe without blocking it.

The manufacture of suitable air-permeable floors for storage vessels has been relatively expensive with the designs known up to now since the perforated backing plate and the covering in a form of woven material were put together in separate sections and held together by means of individual fixtures by riveting or the like.

Apart from the work involved in doing this, this arrangement has the disadvantage that the floor has fixtures on the side towards the goods which hinder the flow of goods, i.e. the powdered material, and which can detrimentally affect the intended action of the air-permeable floor.

The aim of the innovation is to create a storage vessel or feed unit which eliminates the above-mentioned disadvantages and to produce air-permeable guiding or separating walls for storage vessels or feed units which are both simple in design and simple to manufacture. This aim is achieved in accordance with the invention essentially in that the covering consisting of one or more layers of woven material is fixed to the perforated backing plate by adhesive and that the area of the surfaces covered with adhesive is dimensioned according to the desired flow resistance. These features mean that the parts of the floor coming in contact with the goods to be fed or aerated have a continuous smooth surface which does not affect the flow of goods in any way.

In addition, any desired flow resistance may be achieved by choosing the sizes of the surfaces covered with adhesive so that it is easy to adapt to the particular goods to be fed or the given operating conditions. Thus, for example, the same size of perforated plate can be used for different sizes of storage vessel or feed units such as feed channels or the like, but can have different flow resistances, and therefore a different effect on the goods to be fed, as a result of different dimensions of the surfaces covered with adhesive. It is therefore preferable that the woven material should be applied to the backing plate after this has been pretreated according to the desired size of surfaces covered with adhesive.

Clearly it is within the scope of the invention for the covering to be treated after application to obtain the desired size of surface covered with adhesive, which then determines the flow resistance.

The proposal according to the invention ensures that in every case a simple joint between the air-permeable covering and the perforated backin plate can be achieved and that a smooth surface is obtained so that the flow of the goods to be fed or of the powdered material in the storage vessel along the air-permeable guiding or separating walls is not hindered.

In accordance with a further feature it is convenient that the surfaces of the woven material which are to be covered with adhesive should be penetrated to their whole depth with adhesive and anchored to the perforated backing plate. This ensures that the covering is securely attached to the backing plate so that even with large air flows the covering cannot lift off at the adresive-covered surfaces.

In the case of feed units it is recommended that the backing plates with the covering stuck to them should be in the form of rings and should be held in an airtight shell. This is particularly recommended in the case of feed pipes for powdered material for which a substantial reduction in the manufacturing costs can be achieved by use of the invention and in addition the respective flow resistance can be varied or determined in a simple manner. In the case of feed elements of this kind it is recommended that on the side away from the perforated backing plate the woven material should be given an airtight layer so that an optimum effect can be achieved depending on the amount by which the feed element, i.e. for example the feed pipe, is inclined.

Both in the application to a storage vessel and in the application to a feed element, it is recommended in accordance with the innovation that the adhesive should be settable for example a synthetic resin adhesive or the like.

The accompanying drawings depict embodiments of the invention.

In the drawings:

FIGURE 1 shows a storage vessel for powdered materials in a simplified representation in cross-section, FIGURE 2 shows a portion of the air-permeable separating wall inside the storage vessel on a larger scale than FIGURE 1, FIGURE 3 shows an alternative form of the separating wall to that shown in FIGURE 2, FIGURE 4 shows a cross-section through a feed pipe.

At the lower end of a housing 1 with any suitable shape of cross-section there is a tapered floor 2 with an outlet 3 in the form of a connecting piece opening into the inside of the storage vessel. The floor 2 has another connecting piece 4 through which air or gas is introduced into the housing 1. Between the floor 2 and the powdered material 5 held in the housing or storage vessel 1 there is a separating wall which consists of a perforated backing plate 6 with a covering 7 on the side towards the powdered material.

As can be seen in particular from FIGURE 2, the backing plate 6 has holes 6' with a given diameter at predetermined separations, whilst the air-permeable covering 7 in the form of one or more layers of woven material is joined to the perforated backing plate 6 by a layer of adhesive 8. The size of the layer of adhesive 8 determines the area of the covering 7 adhering to the perforated backing plate 6, and therefore the flow resistance to air passing to the inside of the housing or holder 1.

FIGURE 3 shows that the resistance to flow through the air-permeable covering 7 can be determined by the dimensions of the adhesive layer 8. Whereas with the arrangement in FIGURE 2 of the drawing the adhesive layer 8 goes right up to the respective holes 6', in the embodiment in FIGURE 3 of the drawing the dimensions of the layer of adhesive 8 are such that there are gaps before the edges of the holes 6', i.e. the size of the air-permeable areas is greater than in FIGURE 2. Obviously this arrangement can be used in the same way with different perforated backing plates.

FIGURE 4 depicts a feed element in the form of a feed pipe 9 which consists of a larger shell with a connecting piece 10 for introducing air into the pipe, and a concentrically arranged perforated backing plate 11 with an air-permeable covering 12. The air-permeable covering 12 in the form of one or more layers of woven material is placed on the outside of the perforated backing plate 11 so that the powdered material 5' inside the substantially tubular perforated backing plate 11 can be aerated and made capable of flowing.

The air-permeable covering 12 is joined to the perforated backing plate 11 by gluing in the previously mentioned manner, the size of the glued surface determining the flow resistance. The glued area can be, for example, as in FIGURE 2 or as in FIGURE 3.

Over the upper zone of the covering 12 there is a layer of adhesive 13 which is impermeable to air and prevents the powdered material 5' from escaping from inside the backing plate 11. The size of the outer air-impermeable layer of adhesive on the covering 12 can be chosen according to the respective operating conditions or according to the particular powdered material. For example, there can be a given ratio between the areas of the outer layer of adhesive 13 and of the layer of adhesive for joining the covering 12 to the perforated backing plate 11.

The layer of adhesive achieves a reliable joint between the covering and the backing plate in every case and ensures that the flow resistance can be regulated and adapted to given conditions in a simple manner.

The adhesive is preferably a thermosetting synthetic resin adhesive which hardens and thus forms a smooth surface.

I claim:
1. A feed element for powdered materials comprising an outer airtight shell, a perforated inner shell and an air-permeable covering secured to the outside of said perforated inner shell, having the improvement that the air-permeable covering comprises at least one layer of woven material secured to the perforated inner shell by adhesion extending over a proportion being chosen according to the desired resistance to air flow of the covering.

2. A feed element as claimed in claim 1, which has an air impermeable layer over a portion of the covering on the outer surface thereof.

3. A feed element as claimed in claim 2, wherein the said air impermeable layer is formed by a layer of adhesive.

References Cited

UNITED STATES PATENTS

| 1,759,983 | 5/1930 | Houston | 302—29 |
| 3,246,805 | 4/1966 | Kemp | 222—195 |

FOREIGN PATENTS 680,460  10/1952  Great Britain.

SAMUEL F. COLEMAN, *Primary Examiner.*